United States Patent
Roussel et al.

(10) Patent No.: US 6,669,252 B2
(45) Date of Patent: Dec. 30, 2003

(54) MOTOR VEHICLE BUMPER BEAM, AND A BUMPER FITTED WITH SUCH A BEAM

(75) Inventors: Thierry Roussel, Fayl la Foret (FR); Thierry Cavillon, Jasseron (FR); David Bouguedra, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/194,012

(22) Filed: Jul. 15, 2002

(65) Prior Publication Data

US 2003/0020291 A1 Jan. 30, 2003

(30) Foreign Application Priority Data

Jul. 16, 2001 (FR) .............................. 01 09479

(51) Int. Cl.[7] .............................................. B60R 19/04
(52) U.S. Cl. ...................................... 293/120; 293/151
(58) Field of Search ................................ 293/102, 117, 293/120, 132, 133, 146, 147, 148, 149, 151, 152, 153

(56) References Cited

U.S. PATENT DOCUMENTS

| | | | | |
|---|---|---|---|---|
| 4,482,180 A | * | 11/1984 | Huber et al. | 293/120 |
| 4,542,925 A | * | 9/1985 | Huber et al. | 293/120 |
| 4,652,032 A | | 3/1987 | Smith | |
| 4,826,226 A | * | 5/1989 | Klie et al. | 293/120 |
| 6,322,115 B1 | * | 11/2001 | Devilliers | 293/120 |

FOREIGN PATENT DOCUMENTS

| | | |
|---|---|---|
| DE | 197 50 978 A1 | 4/1998 |
| EP | 0 323 038 A2 | 7/1989 |
| FR | 2 364 789 | 4/1978 |
| FR | 0 750 936 A1 | 1/1998 |

* cited by examiner

Primary Examiner—Stephen T. Gordon
Assistant Examiner—Jason Morrow
(74) Attorney, Agent, or Firm—Oliff & Berridge, PLC

(57) ABSTRACT

The invention relates to motor vehicle bumper beam. The beam comprises a longitudinal base element 1 and an additional element 2. The two elements engage one in the other and they comprise snap-fastening elements 9, 10, 11 providing a rigid mechanical connection between their longitudinal edges. The invention also provides a motor vehicle bumper having such a beam.

15 Claims, 6 Drawing Sheets

MOTOR VEHICLE BUMPER BEAM, AND A BUMPER FITTED WITH SUCH A BEAM

BACKGROUND OF THE INVENTION

The present invention relates to a motor vehicle bumper beam and to a bumper fitted with such a beam.

Motor vehicle bumper beams need to present a degree of rigidity in order to provide sufficient protection to passengers in the event of an accident.

For this purpose, it is the practice to make a beam out of materials that are strong, and in particular out of plastics materials that are reinforced with fibers, such as glass fibers.

To further improve the rigidity of a beam, its cross-section can be made to be non-rectilinear, both in order to increase its section and in order to form wedges that oppose bending of said beam.

Thus, by suitably selecting the material used and the shape of its cross-section, a satisfactory level of rigidity for the beam can be achieved quite effectively.

Nevertheless, such a beam may be of a shape that cannot be made by injection molding, or that is too complex to make by injection molding.

That is why the blow-molding method is sometimes preferred over the injection-molding method.

Nevertheless, injection molding is particularly advantageous in terms of cost and of quality criteria for the final beam, both mechanically and in terms of appearance. The beam is generally more accurate, i.e. of exactly the right dimensions and with a better finish when made by injection molding.

The difficulty of using injection molding to obtain bumper beams of relatively complex shape so as to present good rigidity is a problem which the present invention seeks to resolve.

SUMMARY OF THE INVENTION

To this end, the present invention provides a motor vehicle bumper beam characterized in that it comprises a longitudinal base element suitable for extending from one fixing point to another on the vehicle, and an additional element, the two elements being suitable for engaging one in the other and comprising snap-fastening means for providing rigid mechanical connection between longitudinal edges of said two elements.

Because of this rigid mechanical connection, the assembly constituted by the two inter-engaged elements presents rigidity that is greater than that of each of the two elements taken separately.

In a preferred embodiment of the invention, the snap-fastening means are constituted by chamfered tabs secured to a longitudinal edge of one of the elements, which tabs penetrate in orifices provided on a longitudinal edge of the other element.

The chamfers are preferably configured in such a manner that once the tabs are engaged in the orifices they can no longer be extracted therefrom. In other words, in this variant, the snap-fastening of the two inter-engaged elements is irreversible.

The bumper beam of the invention is designed to be fixed to the side rails of a vehicle, for example. To this end, at each of its ends it has points on the longitudinal base element for fixing to said side rails.

In a first embodiment of the invention, the additional element extends from one fixing point to the other and has its own fixing points for fixing to the vehicle.

In another embodiment of the invention, the additional element extends only over a limited fraction of the longitudinal base element.

According to a particular characteristic of the invention, one or each of the two elements includes reinforcing ribs.

Such ribs are distributed, possibly at varying density, over the entire length of each element.

For example, the density of ribs is advantageously higher in the regions of the elements that are in register with the side rails.

In particularly advantageous manner, at least one of the two elements is prestressed by being engaged with the other element in a prestress direction that is perpendicular to the expected impact direction, so as to press the two elements against each other and prevent vibration being generated.

For example, if the geometrical configuration of the two elements is such that after being mutually engaged one of the elements contains the other, then the outer element, i.e. the element containing the other element, can be configured in such a manner that at rest it presents two side flanges between which the inner element is engaged, these two flanges leaving between them a space that is slightly smaller than the corresponding dimension of the inner element, such that inter-engagement causes the two side flanges to be spaced apart, thereby prestressing the outer element.

The beam of the invention presents the advantage of having geometrical and mechanical characteristics that are easily adapted to the vehicles for which it is intended.

The beam can be adapted mechanically by selecting an additional element that provides extra rigidity in an amount that depends on the weight and the equipment level of the vehicle in question.

The additional element can also make it possible to adapt the beam to the particular shape of a bumper shield. In which case, it is possible to make standard longitudinal base elements which are associated with additional elements that are shaped geometrically in a manner that is specific to each model of vehicle.

In a particular embodiment of the invention, the additional element serves not only to increase the rigidity of the assembly, but also to provide a specific impact-absorbing function, for example absorbing impacts against pedestrians, referred to briefly as "pedestrian impacts".

Under such circumstances, it is advantageous in a particular variant to provide clearance between the two assembled-together elements in the expected impact direction so as to enable the additional element to perform its pedestrian impact absorbing function before the longitudinal base element becomes involved in the impact.

In a particular embodiment of the invention, the longitudinal base element presents a W-shaped section and the additional element presents a channel section, the additional element being designed to fit over the longitudinal base element.

More generally, it is advantageous for the longitudinal base element to present at least one convex portion and for the additional element to present at least one concave portion suitable for receiving the longitudinal beam element or at least the convex portion thereof.

In a particular variant, the beam has mechanical means for preventing the outer element from separating in the event of the assembly of inter-engaging elements being subjected to external stress, so as to guarantee that even in the event of an impact said assembly maintains its high second moment of area that results from inter-engaging the two elements, and performs well mechanically.

By way of example, such mechanical means can be a geometrical configuration of the two elements in which the two elements alternate between being the inner element and the outer element in a cross-section of the beam and on going from one end of the beam to the other.

By means of such a configuration, the inner element which is prevented from moving away by the outer element in a given section of the beam becomes in turn the inner element which is prevented from moving away from the outer element in another section of the beam.

More generally, if the inter-engagement of the two elements is such that neither of them can ever be considered as being the outer element or the inner element, then the geometrical configuration is such that the relative positions of the two elements are interchanged at least once between two cross-sections of the beam.

Another advantage of such a geometrical configuration lies in the fact that between two sections in which the relative positions of the two elements are interchanged, at least one of the elements has transition portions forming transverse bearing surfaces which constitute means for centering the two elements that are engaged one relative to the other.

In accordance with the invention, each of the two beam elements may be made of any material. For example, a material that is suitable for use in the invention is polypropylene, and more generally it is possible to use any injectable thermoplastic material, an alloy of thermoplastic materials, or a metal alloy of aluminum or of steel.

Which material it is most appropriate to select naturally depends on the mechanical characteristics desired for the beam.

The present invention also provides a motor vehicle bumper including a bumper beam as described above.

BRIEF DESCRIPTION THE DRAWINGS

To make the invention easier to understand, there follows a description of a non-limiting embodiment shown in the accompanying drawings, in which.

DETAILED DESCRIPTION OF PREFERRED EMBODIMENTS

Figure 1:
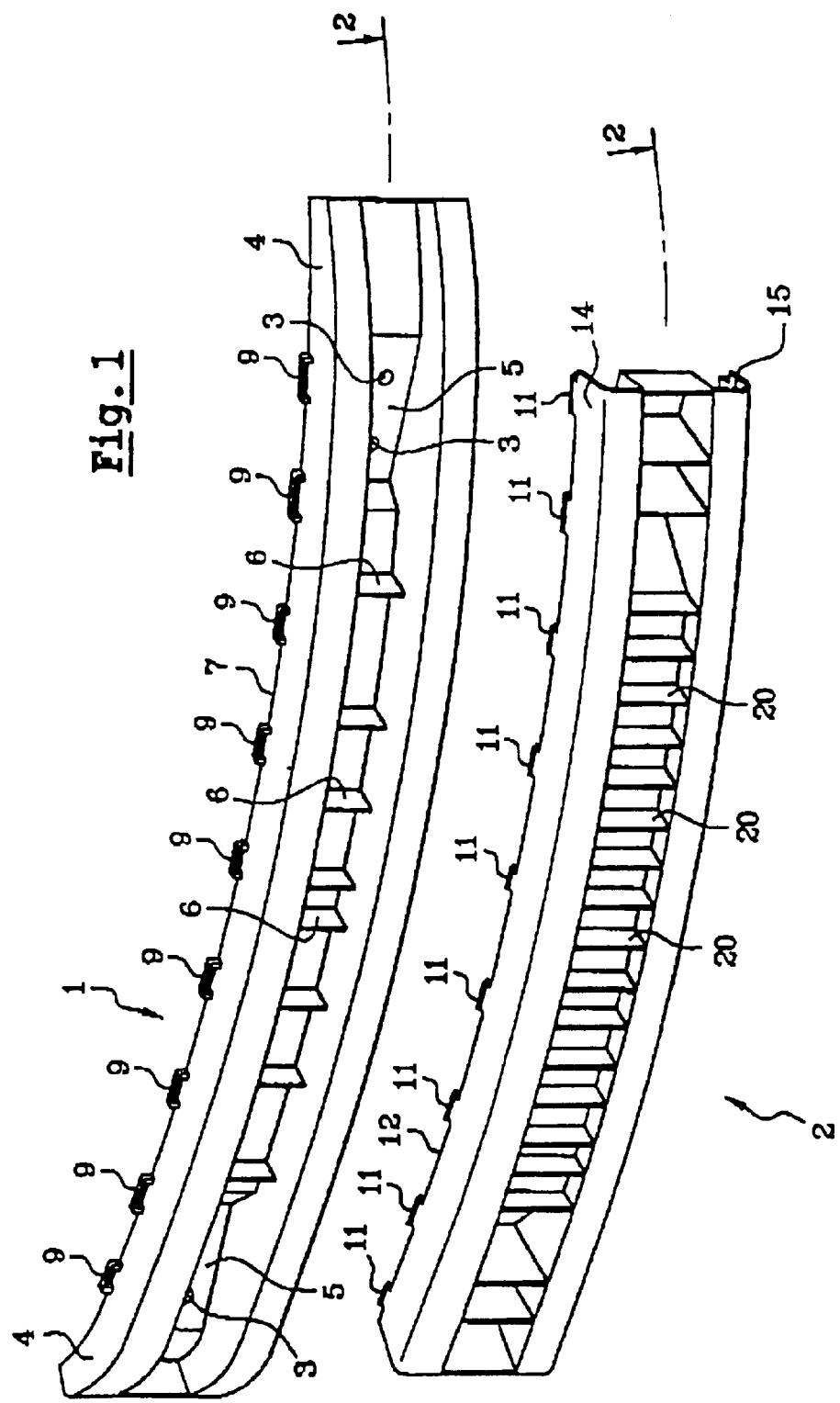
FIG. 1 is a perspective front view of two component elements in an assembly of the invention prior to the elements being engaged one in the other.

FIG. 1 shows a longitudinal base element 1 and an additional element 2, both made by injection molding polypropylene.

The longitudinal base element 1 covers the entire width of the vehicle and projects beyond fixing points 3 where the beam is fixed to the side rails of the vehicle (not shown) by overriders 4 for receiving corner impacts.

The fixing points 3 comprise orifices made through a plane portion 5 of said longitudinal base element 1, in register with two side rail locations of the vehicle.

Figure 8:
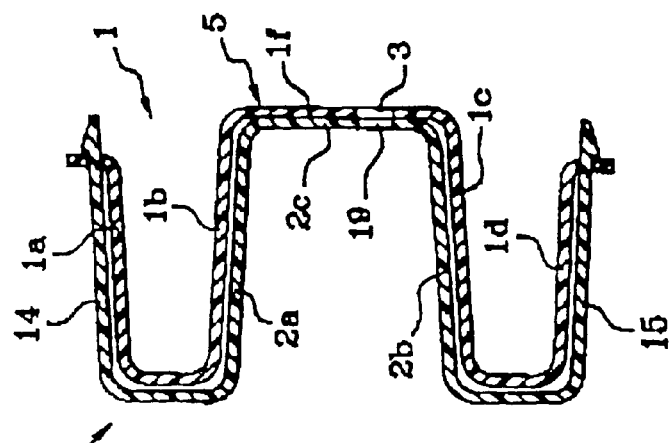
FIGS. 6 to 8 are sections on planes 6, 7, and 8 of FIG. 4.
Figure 7:
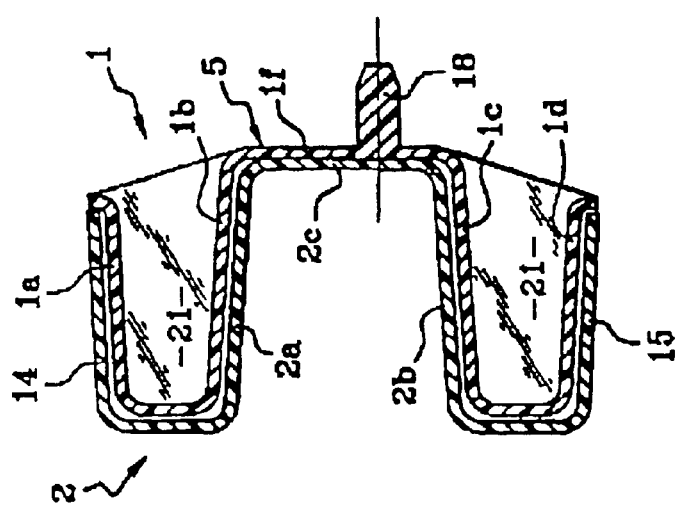
Figure 6:
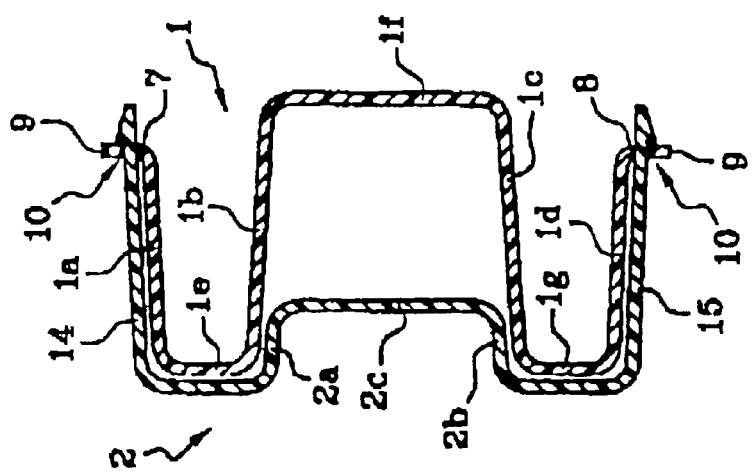

As can be seen in the sections of FIGS. 6 to 8, the longitudinal base element 1 has a W-shaped section so as to comprise four planes 1a, 1b, 1c, and 1d that are substantially horizontal (when the beam is in position in use on a vehicle), which planes are interconnected by three planes 1e, 1f, and 1g that are substantially vertical. The horizontal planes 1a, 1b, 1c, and 1d are oriented appropriately to withstand stresses exerted on the beam in the longitudinal direction of the vehicle (i.e. from left to right in FIGS. 6 to 8). Since they are interconnected by vertical planes 1e, 1f, and 1g, the four horizontal planes sum their rigidities and confer relatively great rigidity to the longitudinal base element.

In its central region, the longitudinal base element 1 is provided with ribs 6 which occupy the space defined by the two independent horizontal planes 1b and 1c. The distribution and the density of the ribs 6 is a design variable to be assessed by the person skilled in the art who will determine them as a function of the mechanical strength desired of the longitudinal element. In the meaning of the present invention, the ribs 6 constitute additional means for stiffening each of the elements constituting the beam, but they have no influence on the inter-engagement effect between the two elements 1 and 2 and on the advantages which stem therefrom.

In register with the plane portions 5 corresponding to the locations of the side rails, the longitudinal base element does not have any ribs.

Finally, along each of its two longitudinal edges 7 and 8, the longitudinal base element is provided with bridges 9 which define orifices 10 for co-operating with snap-fastenable tabs 11 formed to project from the longitudinal edges 12 and 13 of the other element, as described below.

The additional element 2 is a shorter part than the longitudinal base element 1, having two side flanges 14 and 15 whose longitudinal edges 12 and 13 are provided with snap-fastenable tabs 11 that co-operate with the orifices 10 in the longitudinal base element 1.

Each of the flanges 14, 15 constitutes a plane that is horizontal when the beam is in its in-use position, and is oriented in such a manner as to withstand stress directed in the longitudinal direction of the vehicle.

In the middle portion, the additional element also has two intermediate horizontal planes 2a and 2b united by a vertical plane 2c. The planes 2a and 2b are of size that varies depending on the section of the beam under consideration.

As a result, as can be seen in the sections of FIGS. 6 to 8, the section of the additional element is not constant along its entire length.

In its central region, the section of said additional element 2 (see FIG. 6) constitutes a channel section, given that the intermediate horizontal planes 2a and 2b are small, whereas in its end regions, the section of the additional element (see FIGS. 7 and 8) becomes a W-shaped section.

Figure 2:
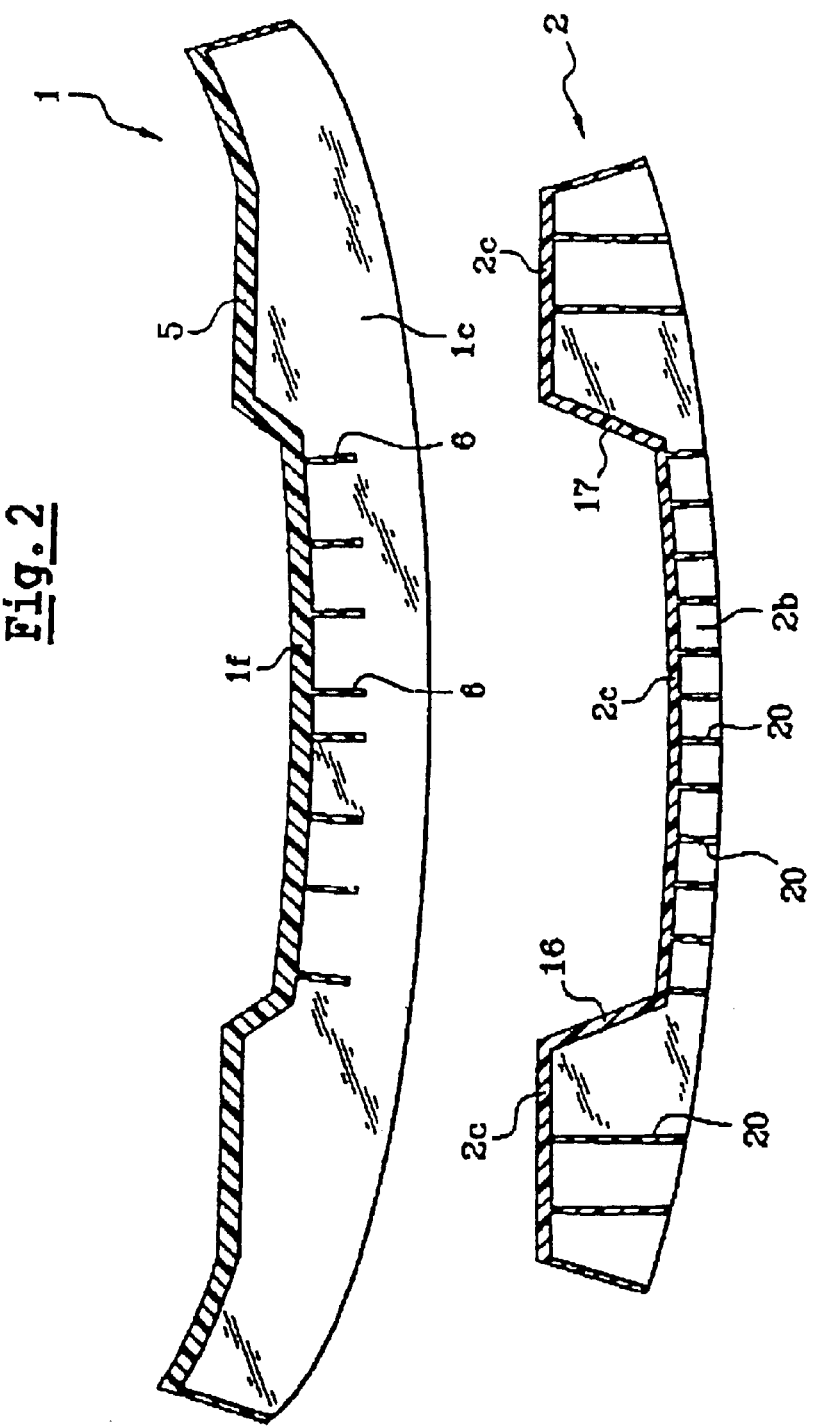
FIG. 2 is a section view on 2 in FIG. 1.

Between these two sections, the additional element has two transition zones 16 and 17 (visible in FIG. 2) in the vertical plane 2c in which said intermediate vertical plane 2c moves progressively from being close to the front face of the additional element to being close to its rear face.

Consequently, this intermediate vertical plane 2c is inclined in the transition zones 16 and 17 relative to the longitudinal direction of the beam and it constitutes a potential bearing surface for the two distal ribs 6 of the central zone of the longitudinal base element. Consequently, the transition zones 16 and 17 serve to center the additional element relative to the longitudinal base element.

As can be seen clearly by comparing the sections of FIGS. 6 to 8, the additional element 2 in the central region of the beam fully contains the longitudinal base element 1 between its two lateral flanges 14 and 15, whereas in the end regions of the beam, beyond the transition zones 16 and 17, the longitudinal base element in turn contains the two intermediate horizontal planes 2a and 2b of the additional element between its own two planes 1b and 1c.

By means of this arrangement, when the two elements are engaged one in the other, they prevent each other from moving apart vertically on being subjected to stresses that are the result of an impact.

Another advantage that stems from the inter-engagement obtained relative to the plane portions 5 can be seen in FIG. 8: the additional element 2 is provided with fixing orifices 19 for fixing to the side rails and which coincide exactly with the orifices 3 of the longitudinal base element 1 such that a single fixing screw (not shown) at each end of the beam suffices to secure both beam elements to the vehicle simultaneously. In addition, the positioning of the orifices in the vicinity of the rear face of the beam makes it easier to put a screw into place and to tighten it.

Finally, in this particular section situated in register with the side rails, the additional element and the longitudinal base element constitute a mutual engagement cone which further improves the connection between them.

In addition to the characteristics described above, the two elements constituting the beam of the invention present further characteristics that are independent of the two elements being engaged one in the other.

Thus, the longitudinal base element has centering pegs 18 on the rear faces of its plane portions 5 for fixing to the side rails.

Similarly, the additional element 2 is provided on its front face with ribs 20 that are formed between its two horizontal planes 2a and 2b and its intermediate vertical plane 2c.

Figure 3:
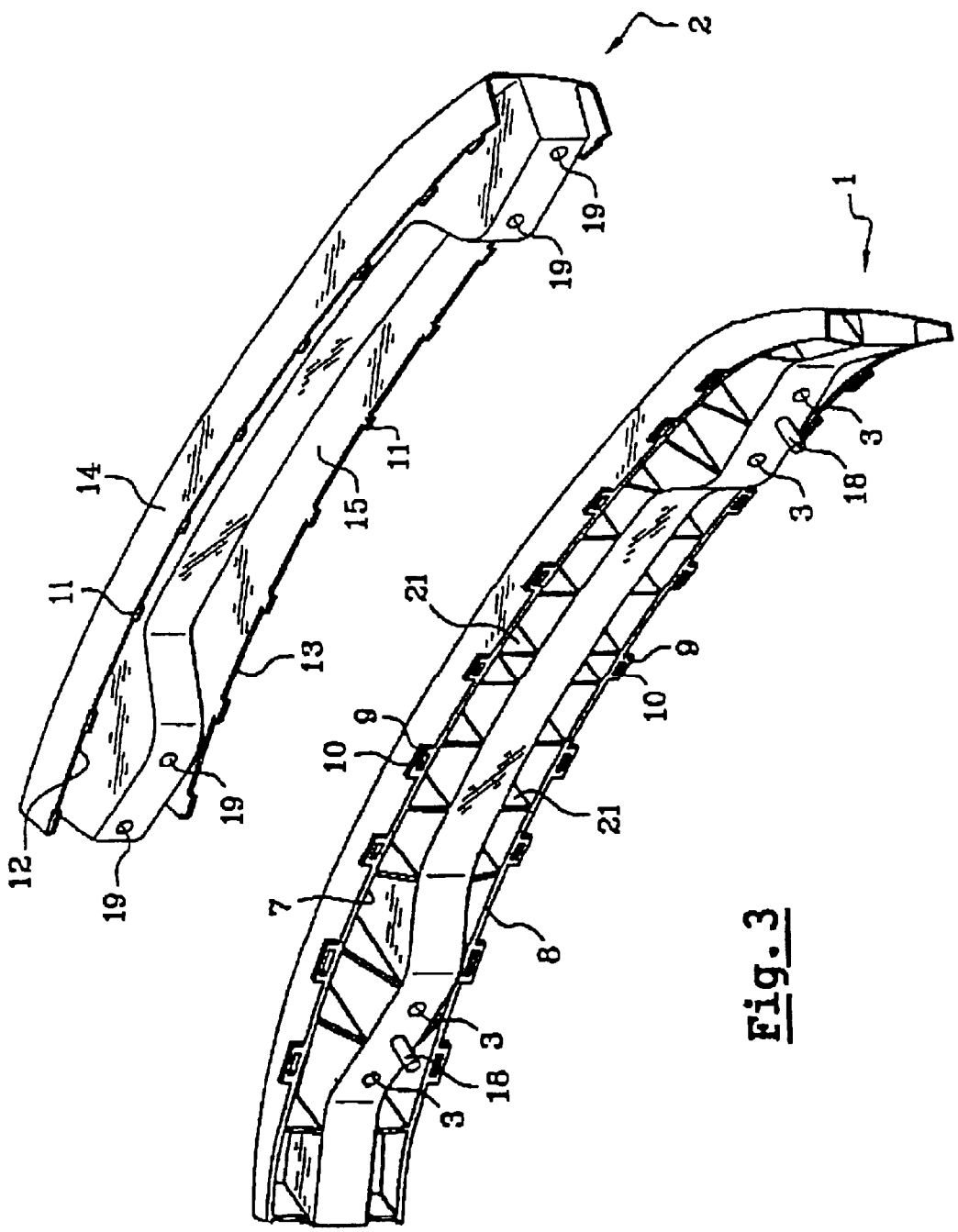
FIG. 3 is a rear perspective view of the two elements of FIGS. 1 and 2.
Figure 4:
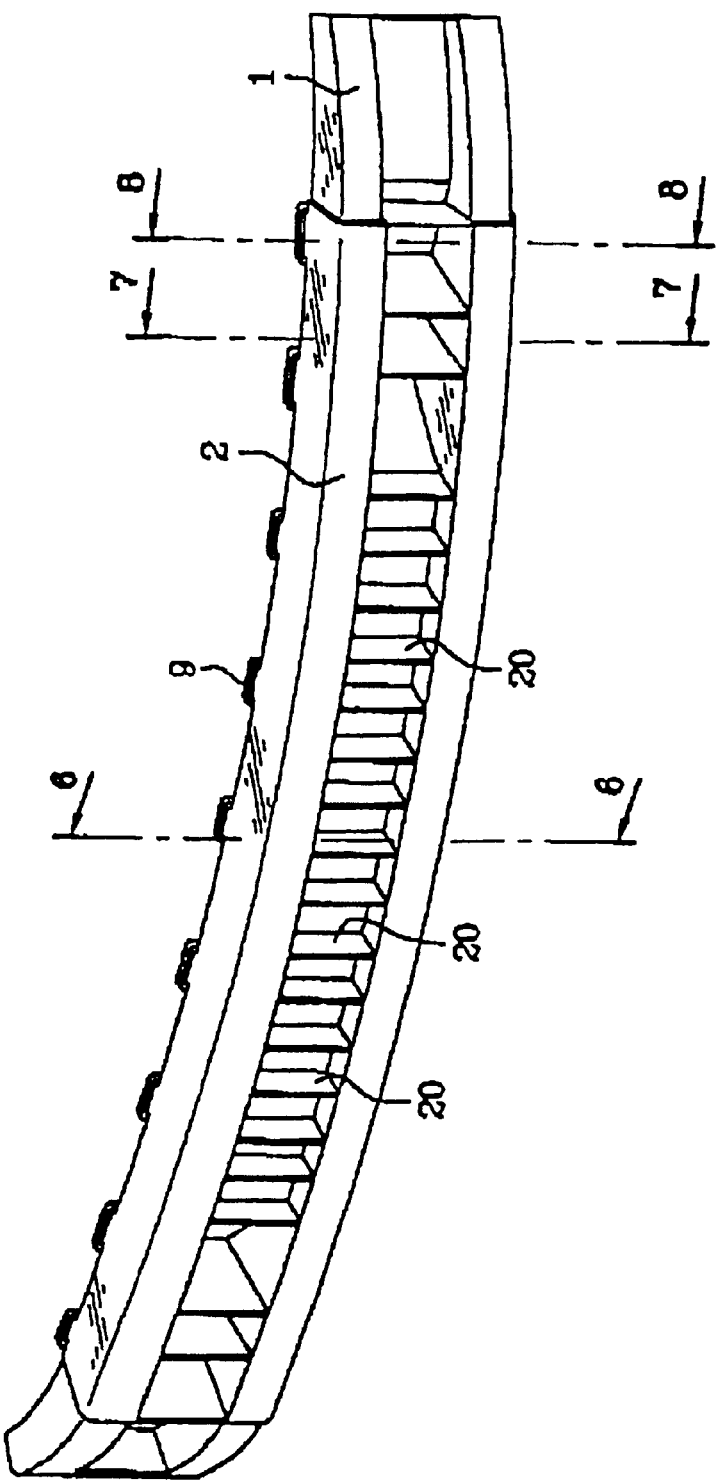
FIG. 4 is a view analogous to FIG. 1 showing the two elements engaged one in the other.
Figure 5:
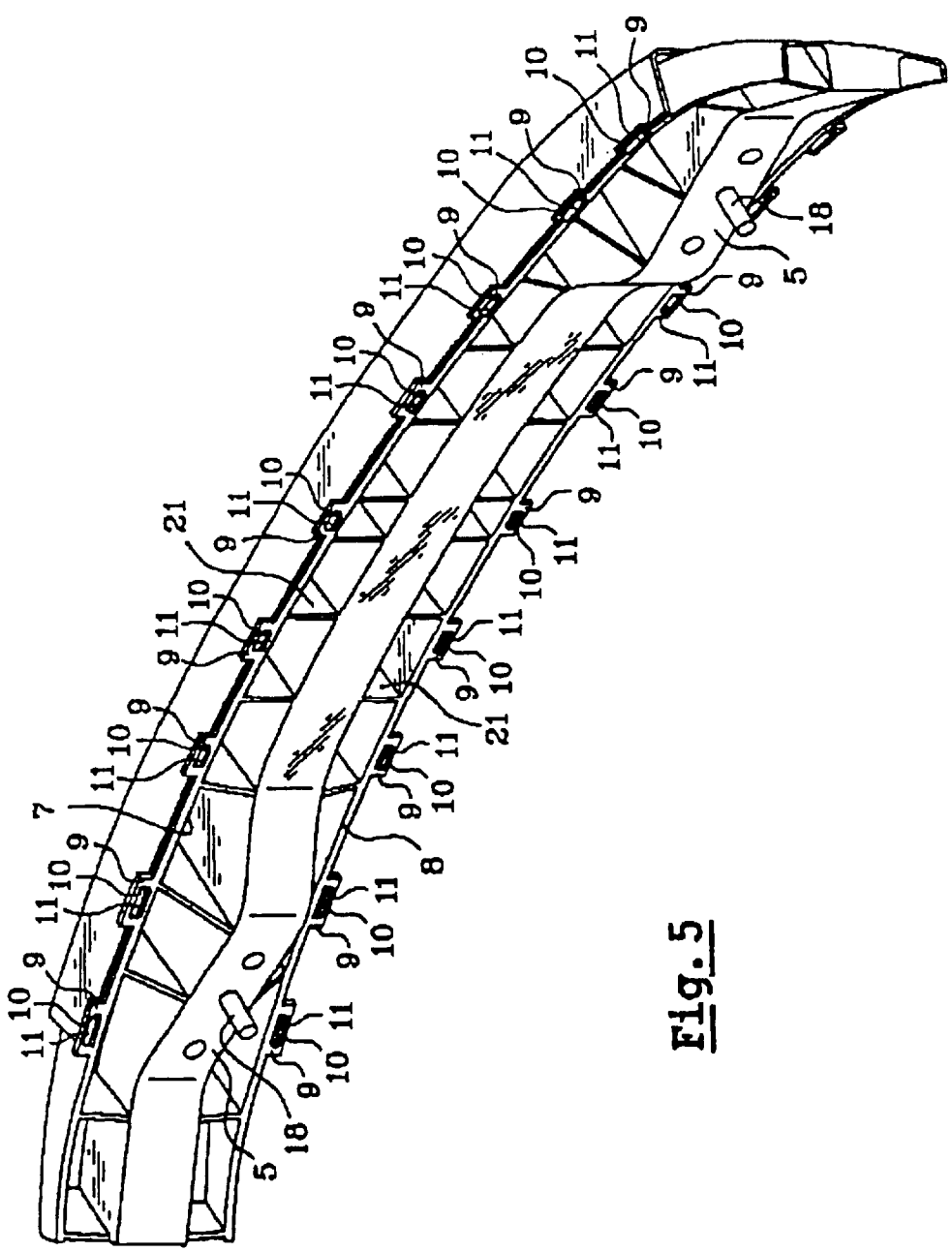
FIG. 5 is a view analogous to FIG. 3 showing the two elements engaged one in the other.

(Furthermore, the longitudinal base element 1 is provided with ribs 21 on its rear face between its horizontal planes 1a, 1b, and 1c, id as can be seen in particular in the section of FIG. 7 and in FIGS. 3 and 5.

The embodiment described above is given purely by way of example and does not imply any limit on the scope of the invention.

In particular, it may be observed that the positioning of the additional element in front of the longitudinal base element is merely by way of example, and it is possible to envisage positioning it between said longitudinal base element and the side rails of the vehicle, particularly when the additional element is a metal part of simple shape while the longitudinal base element is a part of more complex shape, which it is preferable to make by injection molding a plastics material given the complex shape and also given the need to absorb pedestrian impacts.

What is claimed is:

1. A motor vehicle bumper beam, comprising a longitudinal base element suitable for extending from one fixing point to another on the vehicle, and an additional element, the two elements being suitable for engaging one in the other and having snap-fastening means for providing rigid mechanical connection between longitudinal edges of said two elements, wherein the additional element extends from one fixing point to the other and has its own fixing points for fixing to the vehicle.

2. A beam according to claim 1, wherein the snap-fastening means are constituted by chamfered tabs secured to a longitudinal edge of the additional element, which the tabs penetrate in orifices provided on a longitudinal edge of the base element.

3. A beam according to claim 1, characterized in that it further comprising fixing points at each end of the longitudinal base element for fixing to side rails of the vehicle.

4. A beam according to claim 1, wherein the additional element extends over only a limited fraction of the base element.

5. A beam according to claim 1, wherein one or each of the two elements has reinforcing ribs.

6. A beam according to claim 1, wherein at least one of the two elements is pre-stressed by being engaged with the other element, the pre-stress being in a direction perpendicular to the-an expected impact direction.

7. A beam according to claim 1, wherein, between the two assembled-together elements, the beam includes a clearance in an expected impact direction.

8. A beam according to claim 1, wherein the longitudinal base element presents at least one convex portion, and the additional element presents at least one concave portion and convex portion for receiving the longitudinal base element.

9. A beam according to claim 8, wherein the longitudinal base element presents a W-shaped section and the additional element presents a channel section, the additional element being designed to fit over the longitudinal base element.

10. A beam according to claim 1, further comprising mechanical means for preventing the additional element from moving away when the assembly of the two inter-engaged elements is subjected to external stress.

11. A beam according to claim 10, wherein the mechanical means are constituted by a geometrical configuration of the two elements such that the relative positions of the two elements are reversed at least once between two cross-sections of the beam.

12. A beam according to claim 11, wherein the geometrical configuration of the two elements is such that these two elements alternate between being an inner element and an outer element, when considered in cross-section of the beam and on going from one end of the beam to the other.

13. A beam according to claim 11, wherein between two sections in which the relative positions of the two elements are reversed, at least one of the elements has transition portions forming transverse bearing surfaces, which surfaces constitute means for centering the two inter-engaged elements relative to each other.

14. A motor vehicle bumper including a bumper skin and a bumper beam according to claim 1.

15. A beam according to claim 1, wherein the longitudinal base element presents at least one convex portion and the additional element presents at least one concave portion suitable for receiving at least the convex portion of the longitudinal base element.

* * * * *

UNITED STATES PATENT AND TRADEMARK OFFICE
CERTIFICATE OF CORRECTION

PATENT NO. : 6,669,252 B2
DATED : December 30, 2003
INVENTOR(S) : Thierry Roussel, Thierry Cavillon and David Bouguedra It is certified that error appears in the above-identified patent and that said Letters Patent is hereby corrected as shown below:

<u>Column 6,</u>
Line 9, delete the following:
"3. A beam according to claim 1, characterized in that it further comprising fixing points at each end of the longitudinal base element for fixing to side rails of the vehicle."
and replace with:
-- 3. A beam according to claim 1, further comprising fixing points at each end of the longitudinal base element for fixing to side rails of the vehicle. --.
Line 25, delete the following:
"8. A beam according to claim 1, wherein the longitudinal base element presents at least one convex portion, and the additional element presents at least one concave portion and convex portion for receiving the longitudinal base element."
and replace with:
-- 8. A beam according to claim 1, wherein the longitudinal base element presents at least one convex portion, and the additional element presents at least one of a concave portion and convex portion for receiving the longitudinal base element. --.

Signed and Sealed this

Twenty-first Day of March, 2006

JON W. DUDAS
*Director of the United States Patent and Trademark Office*